3,074,849
COMPOSITIONS COMPRISING TETRACYCLINE-TYPE ANTIBIOTIC IN COMBINATION WITH POLYIMIDO PHOSPHATE AMMOUNIUM SALT
Frank H. Buckwalter, Dewitt, and Murray A. Kaplan and Alphonse P. Granatek, Syracuse, N.Y., assignors, by mesne assignments, to Bristol-Myers Company, New York, N.Y., a corporation of Delaware
No Drawing. Filed June 10, 1957, Ser. No. 664,453
5 Claims. (Cl. 167—65)

This invention relates to a formulation of the antibiotic tetracycline which produces unusually high blood levels upon oral administration and more specifically to a mixture of a form of tetracycline and a nontoxic salt of a polyimidophoshate, preferably the ammonium salt.

It is the object of the present invention to provide formulations of tetracycline which effectively increase the blood levels of tetracycline in early hours after oral administration. It is a further object of the present invention to provide formulations of tetracycline which do not furnish the patient an undesirable and even harmful amount of sodium ion. It is another object of the present invention to simultaneously provide increased blood levels of tetracycline and a source of ammonium ions. The objects of the present invention have been achieved by the provision of a therapeutic composition for the treatment of bacterial infection comprising in admixture a form of tetracycline and a nontoxic salt of a polyimidophosphate, said nontoxic salt of a polyimidophosphate being present in an amount by weight equal to at least one-fifth the weight of said form of tetracycline.

The preferred embodiment of the present invention is a therapeutic composition for the treatment of bacterial infection comprising in admixture a form of tetracycline and an ammonium salt of polyimidophosphate, said ammonium salt of polyimidophosphate being present in an amount by weight equal to at least one-fifth the weight of said form of tetracycline.

The amount by weight of the nontoxic salt of a polyimidophosphate used in the mixtures of the present invention is in the range of one-fifth to twice the weight of the form of tetracycline and preferably in the range of four-fifths to twice the weight of the form of tetracycline. On occasion it is desirable to use mixures of two nontoxic salts of a polyimidophosphate, e.g. a mixture of substantially equal parts of potassium polyimidophosphate and ammonium polyimidophosphate.

As used herein, the phrase "a form of tetracycline" includes organic and inorganic acid addition salts, the hydrated or anhydrous amphoteric form, metal salts, chelates, complexes and simple esters which are preferably rapidly hydrolyzed in the body.

The preferred forms of tetracycline are amphoteric tetracycline, tetracycline hydrochloride and the tetracycline sodium hexametaphosphate complex described in U.S. Patent No. 2,791,609. Other salts which are effective include metal salts such as sodium, potassium, calcium, aluminum, magnesium, zirconium and the like and normal organic and inorganic acid addition salts such as the bromide, sulfate, nitrate, orthophosphate, acetate, tartrate, citrate and the like. Use may also be made in the present invention of other physiologically active tetracycline products such as rapidly hydrolyzed esters, chelates and complexes.

Among the nontoxic salts of a polyimidophosphate including the preferred ammonium salt of polyimidophosphate, which are used in the compositions of the present invention are those described in U.S. Patent No. 2,122,122. Thus, the ammonium salt of polyimidophosphate used in each of the working examples below has a typical analysis as follows:

Particle size practically all less than 5 microns.
$P_2O_5$: 76.1%.
$NH_3$: 22.4% (total); 15.4% (free).
Amide N as $NH_3$: 7.0%.
pH (1% solution): 5.6.
Apparent density; 30 pounds per cubic foot (approximate).

The ammonium salt of polyimidophosphate is thus a compound essentially of a nitrogen phosphorus complex resulting from heating a reaction product of $P_2O_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of less than 1.5 to 1. It is preferred that this ratio be less than 1.25 to 1 and even more preferably less than 1.2 to 1.

Use may be made of other nontoxic salts of a polyimidophosphate disclosed in U.S. Patent No. 2,122,122, such as the alkali metal salts including potassium and sodium, the alkaline earth metal salts including calcium and salts of nontoxic metals such as magnesium and aluminum. Of course, the ammonium salt is preferable for use in patients whose sodium intake should be restricted. When administered orally as in the form of capsules nothing else need be added although use may be made, if desired, of additional filling agents, lubricating agents and the like. In the case of aqueous suspensions for oral use, there may be added customary ingredients such as suspending agents, sweetening agents, preservatives, flavors and colors. For parenteral products most of these ingredients are normally omitted but there may be added the agents previously used in parenteral tetracycline products such as ascorbic acid, sources of metal ions such as magnesium chloride, and local anesthetics such as procaine hydrochloride and Xylocaine hydrochloride ($\alpha$-diethylamino-2,6-aceto-xylidide hydrochloride).

The combinations of the present invention can be used for oral application in powdered form, as tablets or in capsules. In capsule form it is preferred to use polyimidophosphate having a particle size of less than five microns. These combinations may also be used in suspensions in aqueous liquids or in anhydrous, edible oils, such as peanut oil, sesame oil, or a modified coconut oil with a setting point below 60° F. or in aqueous emulsions of such oils.

When desired for specific purposes and rendered pharmaceutically compatible, there may be admixed with the combinations of the present invention various other additional medicaments, such as antihistamines, sulfa drugs (e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamine, N'-3,4-dimethylbenzoylsulfanilamide, benzylsulfanilamide and N'-3-(2-quinoxalyl)-sulfanilamide), lipotropic agents (particularly methionine, choline, inositol and beta-sitosterol and mixtures thereof), stimulants of the central nervous system (e.g. caffeine, amphetamines), local anesthetics, analgesics (e.g. aspirin, salicylamide, sodium gentisate, p-acetylaminophenol, phenacetin, codeine), laxatives (e.g. phenolphthalein), sedatives (e.g. barbiturates, bromides), salts of penicillin (e.g. potassium penicillin G, procaine penicillin G, l-ephenamine penicillin G, dibenzylamine penicillin G, and salts disclosed by U.S. Patent No. 2,627,491; these combinations are particularly useful to enable variations of the pattern of blood levels obtained), phenoxymethylpenicillin and salts thereof, other antibiotic agents (e.g. stroptomycin, dihydrostreptomycin, bacitracin, polymixin, tyrothricin, erythromycin, chlortetracycline, oxytetracycline, oleandomycin, chloramphenicol, magnamycin, novobiocin, cycloserine; in some cases such combinations attack a wider range of organisms or show synergistic efficacy or provide decreased toxicity with equal efficacy), vitamins (e.g. vitamins A, $A_1$, B, $B_2$, $B_6$, $B_{12}$ and members of that family, folic acid and members of that family, vitamins C, $D_2$, $D_3$ and E), hormones (e.g. cortisone, hydrocortisone, $9\alpha$-fluorocortisone, $9\alpha$-fluorohydrocortisone, prednisone and prednisolone), anabolic agents (e.g. 11,17-dihydroxy-$9\alpha$-fluoro - $17\alpha$ - methyl-4-androsten-3-one; 17-$\alpha$-ethyl-19-nortestosterone) and antifungal agents (e.g. mycostatin).

A more comprehensive understanding of this invention is obtained by reference to the following examples, which are illustrative only and are not the exclusive embodiment of the invention.

*Example 1*

A mixture of amphoteric tetracycline (two parts by weight) and ammonium polyimidophosphate (three parts by weight) was prepared, filled into capsules and administered orally in single dosage to dogs to provide a dose of 12.5 mgms. tetracycline hydrochloride equivalents per kg. Determination of the blood levels at various times after administration of this single dose gave the following average blood levels: after one hour, 2.45 mcg./ml.; after four hours 2.48 mcg./ml.

*Example 2*

Capsules are filled with a mixture providing, per capsule, 250 mgms. amphoteric tetracycline and 375 milligrams ammonium polyimidophosphate and give high blood levels of tetracycline upon oral administration.

*Example 3*

Capsules are filled with a mixture providing, per capsule, 250 mgms. amphoteric tetracycline and 50 milligrams ammonium polyimidophosphate and give high blood levels of tetracycline upon oral administration.

*Example 4*

Capsules are filled with a mixture providing, per capsule, 250 mgms. amphoteric tetracycline and 500 milligrams ammonium polyimidophosphate and give high blood levels of tetracycline upon oral administration.

*Example 5*

Capsules are filled with a mixture providing, per capsule, 250 mgms. amphoteric tetracycline and 250 milligrams ammonium polyimidophosphate and give high blood levels of tetracycline upon oral administration.

*Example 6*

Capsules are filled with a mixture providing, per capsule, 250 mgms. amphoteric tetracycline and 375 mgms. potassium polyimidophosphate and give high blood levels of tetracycline upon oral administration.

*Example 7*

Capsules are filled with a mixture providing, per capsule, 250 mgms. amphoteric tetracycline, 200 mgms. potassium polyimidophosphate and 200 mgms. ammonium polyimidophosphate and give high blood levels of tetracycline upon oral administration.

*Example 8*

Capsules are prepared which are similar to those of Examples 1 through 7 above except that the amphoteric tetracycline is replaced by tetracycline hydrochloride and give high blood levels of tetracycline upon oral administration.

*Example 9*

Capsules are prepared which are similar to those of Examples 1 through 7 above except that the amphoteric tetracycline is replaced by tetracycline sodium hexametaphosphate complex. These capsules give high blood levels of tetracycline upon oral administration.

*Example 10*

Three dry mixtures suitable for oral use upon reconstitution with water (q.s. ad. 100 cc.) are prepared by mixing 0.375 g. potassium alginate (Kelmar), 40 g. granulated sugar, 0.080 g. 200 mesh U.S.P. methyl Paraben, 0.020 g. 200 mesh U.S.P. propyl Paraben, 0.14 g. reagent grade potassum bisulfite, 0.20 g. U.S.P. potassium citrate, 0.067 g. 200 mesh U.S.P. saccharin, 0.167 g. 200 mesh calcium sucaryl, 2.50 g. amphoteric tetracycline and either 0.50 g., 2.50 g. or 5.00 g. ammonium polyimidophosphate and give high blood levels of tetracycline upon oral administration.

*Example 11*

Three dry mixtures suitable for oral use upon reconstitution with water (q.s. ad. 100 cc.) are prepared by mixing 0.375 g. potassium alginate (Kelmar), 40 g. granulated sugar, 0.080 g. 200 mesh U.S.P. methyl Paraben, 0.020 g. 200 mesh U.S.P. propyl Paraben, 0.14 g. reagent grade potassium bisufite, 0.20 g. U.S.P. potassium citrate, 0.067 g. 200 mesh U.S.P. saccharin, 0.167 g. 200 mesh calcium sucaryl, 2.50 g. tetracycline hydrochloride and either 0.50 g., 2.50 g. or 5.00 g. ammonium polyimidophosphate and give high blood levels of tetracycline upon oral administration.

*Example 12*

Three dry mixtures suitable for oral use upon reconstitution with water (q.s. ad. 100 cc.) are prepared by mixing 0.375 g. potassium alginate (Kelmar), 40 g. granulated sugar, 0.080 g. 200 mesh U.S.P. methyl Paraben, 0.020 g. 200 mesh U.S.P. propyl Paraben, 0.14 g. reagent grade potassium bisulfite, 0.20 g. U.S.P. potassium citrate, 0.067 g. 200 mesh U.S.P. saccharin, 0.167 g. 200 mesh calcium sucaryl, 2.50 g. tetracycline sodium hexametaphosphate complex and either 0.50 g., 2.50 g. or 5.00 g. ammonium polyimidophosphate and give high blood levels of tetracycline upon oral administration.

*Example 13*

A liquid medium was prepared by mixing U.S.P. gum tragacanth (16.8 g.) with 1000 g. granular sucrose, adding the mixture to 2 l. distilled water at 65° C. and stirring until well dispersed. Then 1.5 l. more of distilled water was added and then, in order, 4460 g. granular sucrose, 0.84 g. Tween 85, 6.72 g. methyl Paraben, 1.68 g. propyl Paraben, 29.4 g. sodium chloride, 17.6 cc. flavor, 217.56 g. micropulverized amphoteric tetracycline, 8.4 g. sodium metabisulfite and finally, distilled water q.s. ad. 7100 cc.

The final product was prepared by stirring 1.55 g. ammonium polyimidophosphate into 101.4 cc. of the above liquid medium.

Average blood levels of tetracycline of 1.75 mcg./ml. after one hour and 1.23 mcg./ml. after four hours were obtained by oral administration to dogs of this product in a single dosage of 12.5 mgm. tetracycline hydrochloride equivalents/kg.

*Example 14*

A liquid formulation was prepared by stirring 6.21 g. ammonium polyimidophosphate into 101.4 cc. of the liquid medium of Example 13.

Average blood levels of tetracycline of 3.70 mcg./ml. after one hour and 3.43 mcg./ml. after four hours were obtained by oral administraiton to dogs of this product in a single dosage of 12.5 mgm. tetracycline hydrochloride equivalents/kg.

*Example 15*

Ammonium polyimidophosphate (0.5 g.) was dissolved in 33 cc. water and the pH adjusted to 1.5 by the addition of concentrated hydrochloric acid. To this solution there was added a solution adjusted to pH 1.5 by hydrochloric acid of 5.0 g. tetracycline hydrochloride in 100 ml. water to provide a clear solution of the mixture of the two ingredients.

Similar solutions were prepared using 1.25 g., of 1.7 g. and 2.5 g. of ammonium polyimidophosphate in place of the 0.5 g. used above.

When given orally to dogs, these solutions provide high blood levels of tetracycline.

We claim:

1. A therapeutic composition for the treatment of bacterial infection comprising in admixture a form of tetracycline and an ammonium salt of polyimidophosphate, said ammonium salt of polyimidophosphate being present in an amount by weight equal to at least one-fifth the weight of said form of tetracycline.

2. A therapeutic composition for the treatment of bacterial infection comprising in admixture a form of tetracycline and an ammonium salt of polyimidophosphate, said ammonium salt of polyimidophosphate being present in an amount by weight in the range of one-fifth to twice the weight of said form of tetracycline.

3. A therapeutic composition for the treatment of bacterial infection comprising in admixture amphoteric tetracycline and an ammonium salt of polyimidophosphate, said ammonium salt of polyimidophosphate being present in an amount by weight equal to at least one-fifth the weight of said amphoteric tetracycline.

4. A therapeutic composition for the treatment of bacterial infection comprising in admixture amphoteric tetracycline and an ammonium salt of polyimidophosphate, said ammonium salt of polyimidophosphate being present in an amount by weight in the range of one-fifth to twice the weight of said amphoteric tetracycline.

5. A therapeutic composition for the treatment of bacterial infection comprising a form of tetracycline and an ammonium salt of polyimidophosphate, said ammonium salt of polyimidophosphate being present in an amount by weight in the range of four-fifths to twice the weight of said form of tetracycline.

References Cited in the file of this patent

UNITED STATES PATENTS

| | | |
|---|---|---|
| 2,122,122 | Woodstock | June 28, 1938 |
| 2,596,935 | Malowan et al. | May 13, 1952 |
| 2,658,078 | Blase | Nov. 3, 1953 |
| 2,713,536 | Driskell | July 19, 1955 |
| 2,717,198 | Jones et al. | Sept. 6, 1955 |
| 2,791,609 | Kaplan | May 7, 1957 |
| 2,795,528 | Buckwalter et al. | June 11, 1957 |
| 2,917,517 | Rosenberg | Dec. 15, 1959 |

FOREIGN PATENTS

| | | |
|---|---|---|
| 202,351 | Australia | July 5, 1956 |

OTHER REFERENCES

Boger et al.: "An Evaluation of Tetracycline Preparations," New England Journal of Medicine, vol. 261, No. 17, Oct. 22, 1959, pages 827–832.

"The Use of Imidoyl Phosphates as Intermediates in the Synthesis of Pyrophosphates," in Chemistry and Industry (Great Br.) Sept. 17, 1955, pages 1183–84, No. 38. Brit. patent appn. No. 31958–53, 12716–55.

Drug Trade News, Mfg. Sec., Mar. 9, 1959, page 61.

Eisner et al.: "Enhancement of Serum Levels of Aureomycin in Experimental Animals," J. of Pharmacology and Exptl. Therap., August 1953, pages 442–449.